3,745,144
ZINC CHLORIDE-AMMONIUM CHLORIDE
COMPLEXES AS FLAME RETARDANTS
Richard J. Gobeil, Carrcroft, and Richard N. Knowles, Hockessin, Del., assignors to E. I. du Pont de Nemours and Company, Wilmington, Del.
No Drawing. Filed Oct. 7, 1971, Ser. No. 187,510
Int. Cl. C08f 45/56, 51/56
U.S. Cl. 260—45.75 R    5 Claims

ABSTRACT OF THE DISCLOSURE

Zinc chloride-ammonium chloride complexes in which the molar ratio of ammonium chloride to zinc chloride can vary within the range of 3:1 to 1:1 improve the flame retardancy of polymeric materials. These flame-retarding complexes must be used in the presence of a source of halogen.

BACKGROUND OF THE INVENTION

This invention relates to the use of zinc chloride-ammonium chloride complexes as flame retardants for polymeric materials.

Zinc chloride itself has flame-retarding properties ("Modern Plastics," September 1966, p. 102). However, its use is limited because it degrades many polymers; for example, it causes severe discoloration and loss of strength of halogenated polyesters. Ammonium chloride also is known as a flame retardant but it is volatile and can sublime out of the polymer during fabrication or use.

Zinc chloride-ammonium chloride complexes $$ZnCl_2 \cdot (NH_4Cl)_x,$$

in which $x$ is 1, 2, or 3, are known and are used commercially as galvanizing fluxes. These complexes are non-hygroscopic, while zinc chloride is deliquescent, and ammonium chloride is somewhat hygroscopic. The commercial zinc chloride-ammonium chlorides complexes are quite inexpensive, as compared with conventional flame-proofing materials such as antimony oxide, but they have not heretofore found use as flame retardants.

SUMMARY OF THE INVENTION

According to this invention, it has now been discovered that zinc chloride-ammonium chloride complexes $ZnCl_2 \cdot (NH_4Cl)_x$, in which $x$ can vary from about 1 to about 3, are effective flame retardants for polymeric materials in the presence of a source of organic halogen. Polymeric materials containing these flame retardants have better light transmission and greater mechanical strength than those treated with zinc chloride alone. The zinc chloride-ammonium chloride complexes are incorporated into the polymers at a level of about 0.5–30 weight percent of the final flame retardant polymer composition.

DETAILED DESCRIPTION OF THE INVENTION

Zinc chloride-ammonium chloride complexes suitable in the process of this invention can be obtained commercially from various sources. A typical material is available from E. I. du Pont de Nemours & Co. Inc., under the trade name Zaclon® in a variety of physical forms. These complex salts can be ground into a powder which can easily be dispersed in the polymer. It is usually most convenient to use a powder which will all pass through a 60 mesh (U.S.S. screen size) sieve.

Although in the commercial complexes, $x$ is approximately 1, 2, or 3, mixtures of these complexes in any ratios also can be used. Consequently, for the purposes of this description, $x$ can be any positive number from about 1 to about 3. Likewise, it is possible that the commercial material may contain a minor amount of zinc chloride or of ammonium chloride impurities. All such materials are included within the scope of the present invention, even though the overall molar ratio of ammonium chloride to zinc chloride in the flame retardant may no longer be within the 1–3 range.

These complexes can also be used with other flame retardants, such as various phosphorus or antimony compounds, zinc borate, and alumina hydrate. To be fully effective, these complexes should be used in conjunction with a source of organic halogen. In the case of halogenated polymers no other halogen source is needed. The halogen-containing polymers which are rendered more flame-retardant by treatment with zinc chloride-ammonium chloride complexes include the following:

Halogenated polyurethanes, halogenated polyesters, halogenated epoxy resins, and halogenated polycarbonates.

The halogen in those polymers will be chlorine, bromine, or a mixture thereof, and will constitute from about 10 to about 40 weight percent of the final flame retardant polymer composition. Below 10 weight percent, the flame retardant properties of the polymer composition may not be entirely satisfactory for practical purposes. Above 40 weight percent of the halogen, the mechanical properties of the polymer may be impaired. Bromine is a more effective halogen for flame retardant compositions and usually will not have to be used at such high levels. Compositions in which the amount of bromine is 10–25 weight percent are very satisfactory.

Other polymeric materials require, in addition, a halogen source. These polymers include; individually, or in combination, polypropylene, poly(methyl methacrylate), polyesters, polyurethanes, polystyrene, epoxy resins, acrylonitrile-butadiene-styrene terpolymers, styrene-acrylonitrile copolymers, formaldehyde polymers, polycarbonates, polyvinyl alcohol, polyvinyl acetate, urea-formadehyde resins, and phenol-formaldehyde resins. Unsaturated halogenated polyesters are the preferred polymeric materials.

The added source of halogen can be any highly chlorinated, brominated, or chlorobrominated organic material compatible with the particular polymer system. Typical halogen sources are Chlorwax® 70 (Diamond Shamrock Co.; a highly chlorinated paraffin), Dechlorane® 604 (Hooker; a highly chlorinated organic) and SA–1080 (Dow, pentabromochlorocyclohexane).

The amount of the halogen source in the polymer composition must be such that the halogen, chlorine or bromine, constitutes about 10–40 weight percent thereof. This added source of halogen may be incorporated into the composition in any convenient manner, either together with the zinc chloride-ammonium chloride complex or separately. A simultaneous incorporation of the halogen source and of the flame-retardant complex is the most economical and preferred. The halogen source may be added neat, i.e., without a solvent, or in solution in a solvent. The solvent then is evaporated prior to or during final compounding.

The zinc chloride-ammonium chloride complexes are incorporated into the polymers by mixing the powdered complexes with the powdered or melted polymers using any suitable technique. Such mixing can be accomplished in a blender, an extruder, or blow molding equipment. Mixtures with polypropylene can be conveniently made by extrusion.

These complexes can also be mixed with prepolymers prior to hot pressing and casting operations. Flame retarded, reinforced polyester panels having high light transmission can be produced in this manner.

While flame retarded polymers containing these complexes are usually translucent, they are not completely transparent because zinc chloride-ammonium chloride complexes are not completely soluble in the polymeric material.

The flame retardant complexes contemplated by the present invention do not have the shortcoming of zinc chloride, which degrades the polymers. Furthermore, these complexes are nonhygroscopic and thus easy to handle and to store. Below 0.5 part by weight of the complex per 100 parts of final polymer composition the improvement of flame retardancy is marginal. Above 30 parts by weight per 100 parts of the final composition minimal further improvement of flame retardancy is observed.

This invention is now illustrated by the following representative examples of certain preferred embodiments thereof, wherein all percentages are by weight.

The HLT–15 flammability test used in evaluating the flame retardants, is described by R. E. McMahon, et al., 25th Annual Technical Conference, 1970, Reinforced Plastics/Composites Division of the Society of the Plastics Industry, Inc., in Section 9-C, pages 1–12.

The polyester panels used in these examples were made by mixing the resin and the zinc chloride-ammonium chloride complexes (ground to pass a 60 mesh screen), at 35–40° C. for 30 minutes, and then adding 1% benzoyl peroxide. The mixture was then stirred for an additional period of 20 minutes at 42° C. It was then poured into a mold and pressed at 29,000 p.s.i. on the 2.56 in. diameter (6.50 cm.) piston according to the following heating schedule:

| Time, minutes: | Temperature |
|---|---|
| 15 | 79° C. (175° F.) |
| 20 | 107° C. (225° F.) |
| 20 | 135° C. (275° F.) |

The press was then cooled to 121° C. (250° F.) with air, and then to 65° C. (149° F.) with water before removing the mold.

Hetron® 23925 is a chlorinated polyester composition manufactured by Hooker Chemical Co., and is believed to contain 1,4,5,6,7,7 - hexachloro - [2.2.1]-bicyclohept-5-ene-2,3-dicarboxylic acid polyester with ethylene or propylene glycol and styrene.

Dion® FR 6399 is a brominated polyester composition manufactured by Diamond-Shamrock Co., and is believed to contain a brominated tetrahydrophthalic acid polyester with ethylene or propylene glycol and styrene.

EXPERIMENTAL DATA

| Example | Resin | Additive (percent) | Appearance | HLT–15 |
|---|---|---|---|---|
| A | Hetron® 23925 | None | Clear | 74 |
| B | Dion® FR6399 | do | do | 80 |
| 1 | Hetron® 23925 | ZnCl$_2$·2NH$_4$Cl (4.8) | Highly translucent | 84 |
| 2 | Dion® FR6399 | ZnCl$_2$·2NH$_4$Cl (4.8) | do | 100 |
| 3 | Hetron® 23925 | ZnCl$_2$·3NH$_4$Cl (4.8) | do | 100 |
| 4 | Dion® FR6399 | ZnCl$_2$·3NH$_4$Cl (4.8) | do | 100 |
| 5 | Hetron® 23925 | ZnCl$_2$·3NH$_4$Cl (2.9) | do | 92 |
| 6 | Dion® FR6399 | ZnCl$_2$·3NH$_4$Cl (2.9) | do | 100 |
| 7 | Hetron® 23925 | ZnCl$_2$ (4.8) | Opaque, very weak, yellow, sticky | |
| 8 | Dion® FR6399 | ZnCl$_2$ (4.8) | Red, very weak, sticky | |
| 9 | Hetron® 23925 | NH$_4$Cl (2.9) | Translucent | 80 |
| 10 | Dion® FR6399 | NH$_4$Cl (2.9) | do | 88 |

Comparing the results obtained with zinc chloride-ammonium chloride complexes with those obtained with zinc chloride alone, it can be seen that in the former case good, flame resistant polymers are obtained, while in the latter case the polymers are badly degraded. With ammonium chloride, less flame retardancy is observed than with the complexes. It is to be noted that the complex does not appear to form in situ by mixing the right proportions of zinc chloride and ammonium chloride with the polymer since severe polymer degradation occurs as evidenced by the holes in the resin and the sticky surface of the polymeric sheet. These experiments are not included in the table.

In order to show that the zinc chloride-ammonium chloride complex causes surprisingly small losses in the flexural yield strength of glass reinforced polyester panels, the following tests are run. The flexural yield strength is measured according to ASTM D–790–66. The polyester panel for this test is made according to the previous description with the following modifications. Twelve layers of Volan® A (E. I. du Pont de Nemours and Company, coupling agent) sized glass fabric (J. P. Stevens & Co., Style 181) are used in the construction of the 3.2 mm. (⅛″) thick panel. The panel is made by placing alternate layers of the polyester composition and glass fabric into a mold, carefully removing the air bubbles, and hot pressing according to the previous schedule. This panel contains about 60 weight percent glass. The 3.2 mm. (⅛″) polyester panel is then cut into five 12.7 mm. (½″) bars for the transverse rupture test. Comparative data are shown below in Examples C, D, 11 and 12.

| Example | Resin | Additive (percent) | Flexural yield strength (p.s.i.) |
|---|---|---|---|
| C | Hetron® 92 | None | 64,500 |
| D | Dion® FR6399 | do | 72,500 |
| 11 | Hetron® 92 | ZnCl$_2$·3NH$_4$Cl (2.9) | 59,500 |
| 12 | Dion® FR6399 | ZnCl$_2$·3NH$_4$Cl (2.9) | 68,000 |

We claim:
1. A flame-retardant halogenated polymeric composition containing 0.5–30 weight percent of an ammonium chloride-zinc chloride complex having the formula

$$ZnCl_2 \cdot (NH_4Cl)_x,$$

wherein $x$ is a positive number within the range of about 1 to 3, said halogenated polymeric material containing from 10–40 weight percent of the polymeric, flame-retardant composition of a halogen selected from chlorine, bromine or mixtures thereof wherein the polymer is a halogenated polyurethane, halogenated polyester derived from a dicarboxylic acid and a polyol, halogenated epoxy resin or a halogenated polycarbonate.

2. The composition of claim 1 wherein $x$ is an integer of 1 to 3.

3. The composition of claim 1 wherein the polymer is a halogenated polyester.

4. The composition of claim 1 wherein the halogen is bromine and is present at the level of 10–25 weight percent thereof.

5. A flame-retardant polymeric composition containing 0.5–30 weight percent of an ammonium chloride-zinc chloride complex having the formula $ZnCl_2 \cdot (CH_4Cl)_x$, wherein $x$ is a positive number within the range of about 1 to 3, and 10–40 weight percent of the polymeric, flame-retardant composition of a highly chlorinated, brominated or chlorobrominated organic material compatible with the polymer wherein the polymer is polypropylene, poly(methyl methacrylate), polyester derived from a dicarboxylic acid and a polyol, polyurethane, polystyrene, an epoxy resin, an acrylonitrile-butadiene-styrene terpolymer, a styrene-acrylonitrile copolymer, a formaldehyde homopolymer, a polycarbonate, polyvinyl alcohol, polyvinyl acetate, a urea-formaldehyde resin or a phenol-formaldehyde resin.

(References on following page)

References Cited

UNITED STATES PATENTS

| | | | |
|---|---|---|---|
| 2,288,405 | 6/1942 | Kepfer | 23—97 |
| 3,442,980 | 5/1969 | Grabowski | 260—45.75 |
| 1,318,524 | 10/1919 | Arent et al. | 252—8.1 |
| 1,990,292 | 2/1935 | Leatherman | 252—8.1 |
| 3,162,609 | 12/1964 | Eichhorn | 260—2.5 |
| 3,092,606 | 6/1963 | Ruppert et al. | 260—45.7 |

OTHER REFERENCES

Plastics Institute Transactions, December 1965, vol. 33, pp. 247 to 255, article by Schmidt on flame retarding plastics.

DONALD E. CZAJA, Primary Examiner

V. P. HOKE, Assistant Examiner

U.S. Cl. X.R.

260—2.5 AJ, 2.5 FP, 45.7 R, 45.9, 860, 880

PO-1050
(5/69)

UNITED STATES PATENT OFFICE
CERTIFICATE OF CORRECTION

Patent No. 3,745,144          Dated July 10, 1973

Inventor(s) Richard J. Gobeil & Richard N. Knowles

It is certified that error appears in the above-identified patent and that said Letters Patent are hereby corrected as shown below:

Column 4, line 61, "$ZnCl_2 \cdot (CH_4Cl)_x$" should be -- $ZnCl_2 \cdot (NH_4Cl)_x$.

Signed and sealed this 16th day of April 1974.

(SEAL)
Attest:

EDWARD M. FLETCHER, JR.          C. MARSHALL DANN
Attesting Officer          Commissioner of Patents